Aug. 10, 1954  
O. C. SHUM  
2,686,281  
MEANS FOR ACTUATING GREASE GUNS  
Filed Nov. 2, 1949  
3 Sheets-Sheet 1

Witness  
Edward P. Seeley

Inventor  
Orie C. Shum  
by M. Talbert Dick  
Attorney

Aug. 10, 1954  O. C. SHUM  2,686,281
MEANS FOR ACTUATING GREASE GUNS
Filed Nov. 2, 1949  3 Sheets-Sheet 2
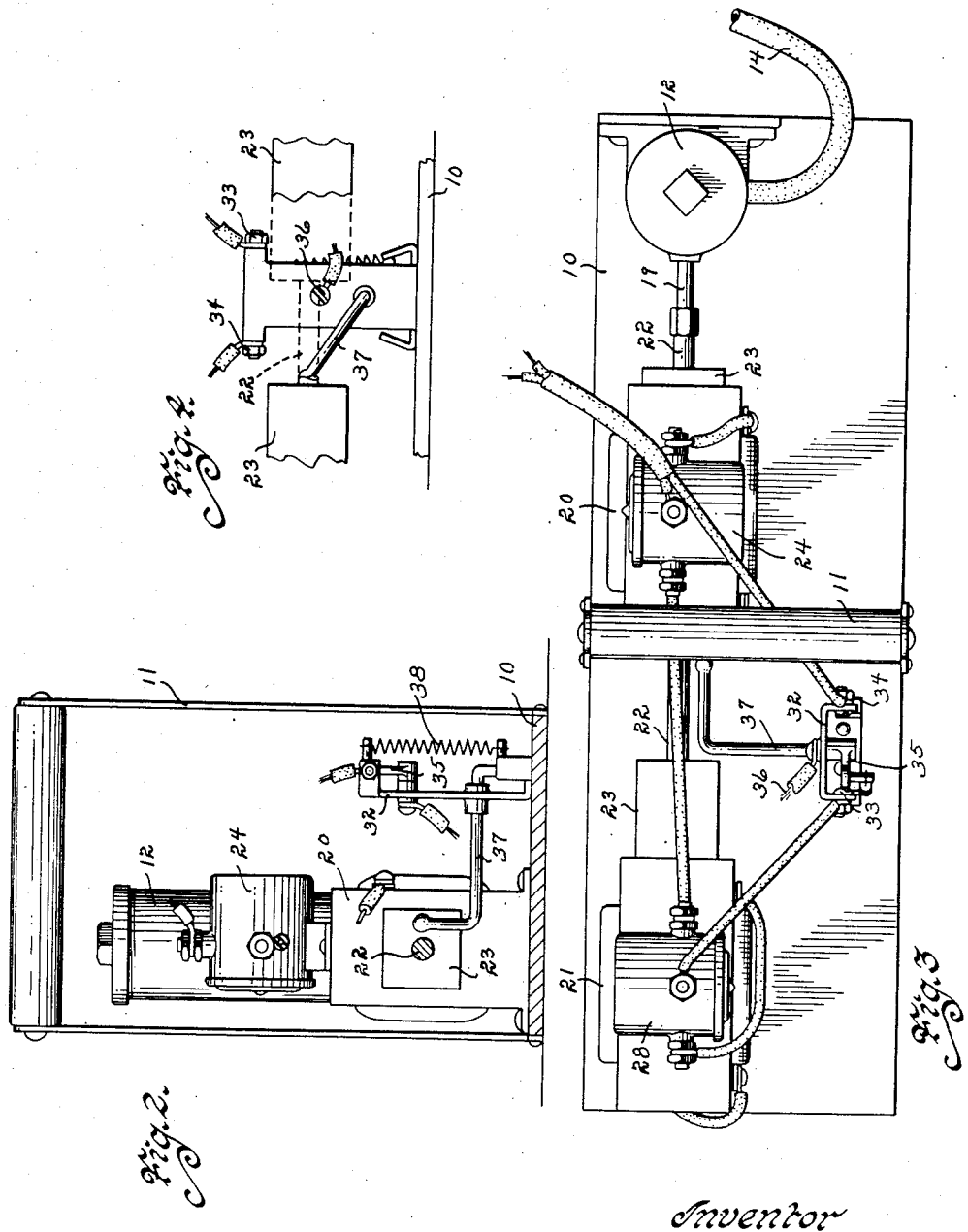
Inventor
Orie C. Shum
by M. Talbert Dick
Attorney
Witness
Edward P. Seeley

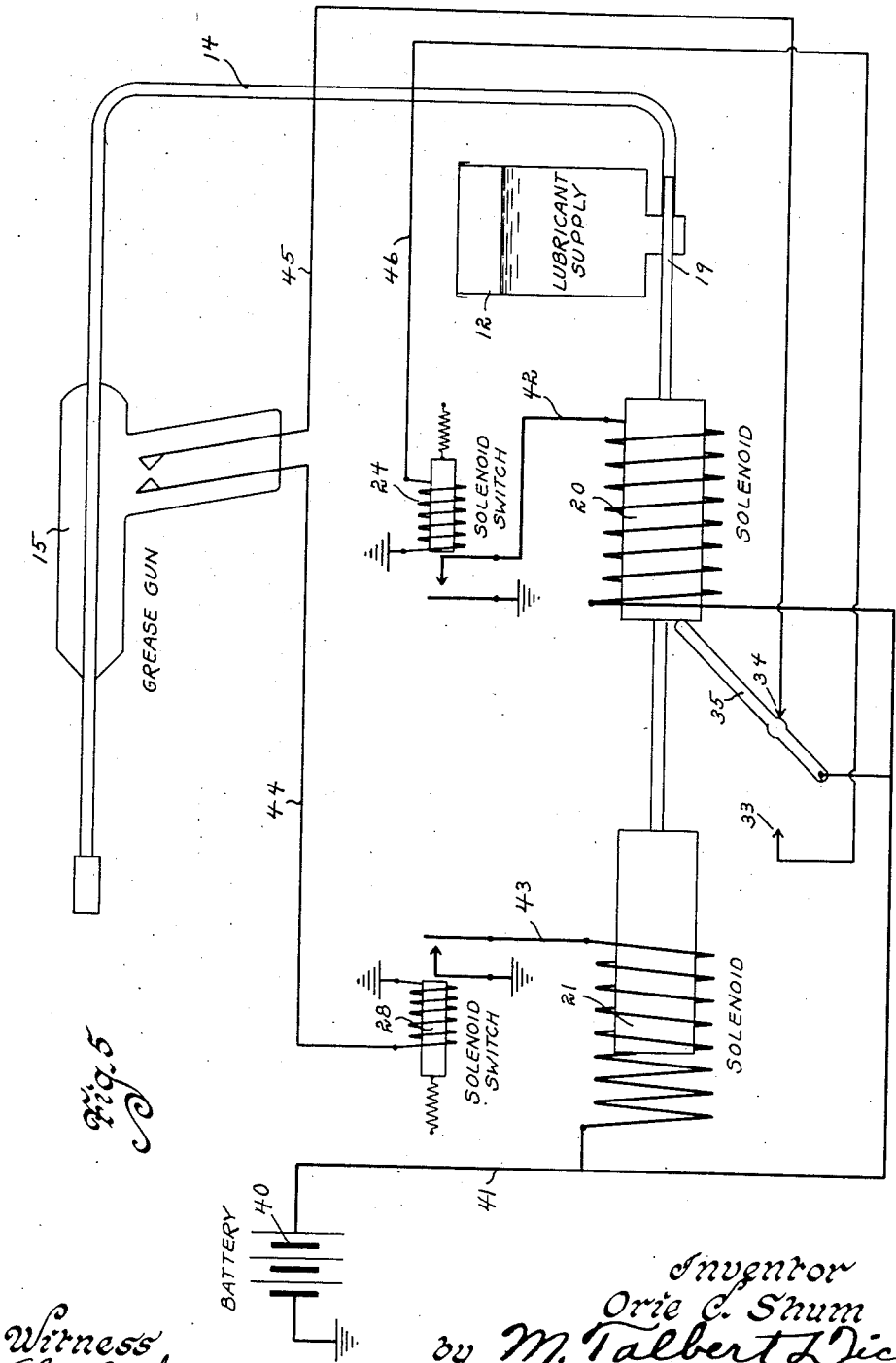

Patented Aug. 10, 1954

2,686,281

UNITED STATES PATENT OFFICE 2,686,281

MEANS FOR ACTUATING GREASE GUNS

Orie C. Shum, Lenox, Iowa

Application November 2, 1949, Serial No. 125,030

4 Claims. (Cl. 318—127)

This invention relates to lubricating equipment for forcing grease into the moving parts of machinery and like.

The use of grease guns per se is very old. Perhaps the most common ones have a manually operated lever for forcing the grease from the gun under pressure and into the parts to be greased. At large grease operations, air under pressure is often used as the motive power. Obviously, the hand operated grease guns are difficult to use. They are slow in operation and do not give the quick pressure shock often needed to obtain grease penetration. While the air pressure operated grease guns are more easily handled and quicker in operation, it is obvious that the elaborate air pressure equipment is available only at large localized establishments. I have overcome such problems by providing a mechanical grease gun actuating means that is rapid, and can be used any place such as at residences to grease automobiles, trucks, or like, or can even be used in the field for greasing tractors and farm equipment.

Therefore the principal object of my invention is to provide a portable mechanized grease gun.

More specifically the object of my invention is to provide a grease gun and pump means that is actuated by an electromagnet or magnets.

A further object of this invention is to provide an efficient grease gun and operating means that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 2 is a cross-sectional view of the device taken on line 2—2 of Fig. 1.

Fig. 3 is a top plan of the pump and actuating means of the device.

Fig. 4 is an enlarged view of the switch means used on the device.

Fig. 5 is a schematic view of the device showing the wiring diagram.

Figure 1:
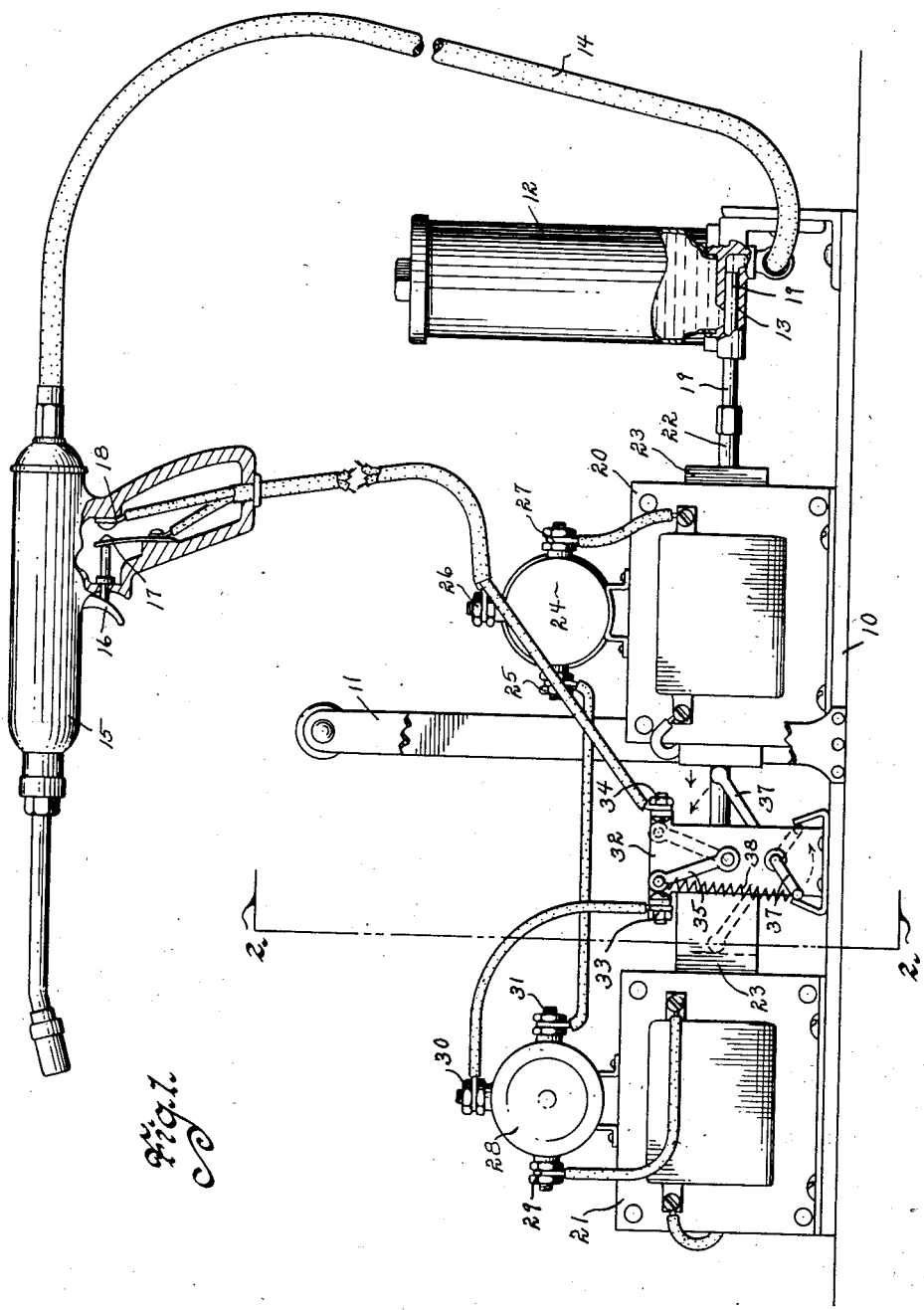
Fig. 1 is a side view of my device with sections cut away to more fully illustrate its construction.

Referring to the drawings I have used the numeral 10 to designate any suitable type base having a carrying bail 11. The numeral 12 designates a grease supply container having a horizontal bore 13 communicating with its inside, as shown in Fig. 1. The numeral 14 designates a flexible hose having one end communicating with the inside of the bore 13 and its other end communicating with a pistol grip grease gun nozzle 15. This grease gun nozzle is of standard design and operation, but does have a trigger 16 capable of forcing the two electric contact points 17 and 18 together when pulled. The numeral 19 designates a rod piston plunger slidably mounted in the bore 13. Obviously, when this piston rod is reciprocated, grease will be drawn into the bore from the grease container and forced from the bore, through the hose and grease gun with hydraulic pressure. The numeral 20 designates an ordinary solenoid having the usual field coil and iron core. The numeral 21 designates a similar solenoid having the usual field coil and iron core. These two solenoids and grease container are aligned on the base 10, as shown in Fig. 3. The numeral 22 designates a metal shaft extending through and connected to the usual movable blocks 23 of the two solenoids and connected to the rod piston 19. By this arrangement when say the solenoid 20 is electrically energized the shaft and piston will be moved forwardly and if the other solenoid is energized the shaft and piston will be moved rearwardly. Adjacent the solenoid 20 is a common solenoid switch 24 having the usual contact connections 25, 26 and 27.

The numeral 28 designates a like solenoid switch for the solenoid 21, having the contact connections 29, 30 and 31. The numeral 32 designates a switch base between the two solenoids having the two contact points 33 and 34. The numeral 35 designates a metallic toggle contact arm pivoted on the base 32, having the contact connection 36 and capable of engaging either the contact point 33 or contact point 34. The numeral 37 designates a double crank arm rotatably mounted in the switch base and having one end capable of being engaged by and moved by either of the square movable centers of the two solenoids, as shown in the drawings.

The numeral 38 designates a coil spring having one end connected to the other end of the double crank arm and its other end connected to the free end of the toggle arm, as shown in Fig. 1. The purpose of this toggle switch, actuated by the reciprocating of the connected solenoids is to switch the electric current first to one solenoid and then the other solenoid, so that the grease piston will be reciprocated as long as the electric circuit is closed. Obviously, other type switches may be used to accomplish this. Also any suitable method of wiring may be used. My purpose is to illustrate one method of causing the electromagnets to be alternately energized. In the drawings I use the numeral 40 to designate a source of electrical energy, preferably a battery so that the device may be used at locations not having electrical power from a generating plant. The positive side of this battery is connected to one of the connections of the field coil of both solenoids by a lead wire 41. The lead wire 42 connects the other end of the field coil of the solenoid 20 to its solenoid switch 24. The lead wire 43 connects the other end of the field coil of the solenoid 21 to its solenoid switch 28. The lead line 44 connects the solenoid switch 28 to the grease gun contact 17. The lead line 45 connects the other gun contact 18 to the contact point 34. The lead wire 46 connects the contact point 33 with the second connection of the solenoid switch 24. The third connection of both the solenoid switches as well as the negative side of the battery are of common ground. The toggle arm is connected to the line leading from the positive side of the battery. This particular hook-up is illustrated in Fig. 5 of the drawings. As the manner of electrical hook-up is within the province of any skilled electrician the details thereof are not specifically pointed out. My chief invention resides in the use of an electromagnet to operate the grease piston rod plunger. In the drawings it is obvious that when the trigger of the grease gun nozzle is manually pressed the circuit will be closed, the solenoid 20 will move the grease piston alternately forwardly and the solenoid 21 will move the grease piston alternately rearwardly. While I do use two electromagnets, it is obvious that only the electromagnet 20 could be used, and a return spring or like used to return the grease piston to the rear when the single electromagnet was not electrically energized.

The purpose of the automatic two-way toggle switch is to alternately furnish electricity to the two solenoids. Obviously, the invention may be applied to the actuating means of any type grease dispenser. The wiring may be done in any suitable manner to properly connect the grease gun switch and electrical parts of the device. Fig. 5 shows only one method of hook-up.

Some changes may be made in the construction and arrangement of my method of and means for actuating a grease gun without departing from the real spirit and purpose of my invention, and it is my intention to cover by my claims, any modified forms of structure or use of mechanical equivalents which may be reasonably included within their scope.

I claim:

1. In a means for actuating a reciprocating plunger grease pump, a base, a first solenoid secured to said base, a second solenoid secured to said base in aligned spaced relation to said first solenoid, a core slidably arranged in each of said solenoids, a shaft connecting said cores, a switch base secured to said base at a point intermediate of the distance between said solenoids and misaligned therefrom, a double crank arm pivotally mounted in said switch base and having one of its ends extending between said solenoids as to operatively engage and be moved by said cores, a pair of spaced stops on said switch base, the other end of said double crank arm engaging alternately each of said pair of stops, a toggle arm hingedly secured to said switch base, a spring connecting said toggle arm to the stop engaging end of said double crank arm, a pair of switch contacts on said switch base and arranged in the path of said toggle arm, a first solenoid switch operatively supported by said base, a second solenoid switch operatively supported by said base, wires connecting one switch terminal of each of said solenoid switches to each of said solenoids, ground connections for the other switch terminal of each of said solenoid switches, a ground connection for one end of the coil in each of said solenoid switches, a wire extending from the coil of one of said solenoid switches to one of said pair of switch contacts, a spring loaded off switch, a wire connecting the other of said pair of switch contacts to one of the switch terminals of said spring loaded off switch, a wire connecting the other switch terminal of said spring loaded off switch to one end of the coil of one of said solenoid switches, a source of electrical energy, a ground connection for said source of electrical energy, and wires connectting said source of electrical energy to one end of each of said solenoids and to said toggle arm.

2. In a means for actuating a reciprocating plunger grease pump, a base, a fisrt solenoid secured to said base, a second solenoid secured to said base in aligned spaced relation to said first solenoid, a core slidably arranged in each of said solenoids, a shaft connecting said cores, a mechanically operated toggle action single pole double throw switch mounted on said base that always has the center terminal and one of the side terminals connected together when the switch mechanism is inactive, a lever secured to said solenoid cores for actuating said mechanically operated toggle action single pole double throw switch by the movement of said solenoid cores, a pair of solenoid switches for controlling the flow of electrical energy to said solenoids, a separate connection between one of the coil terminals of each of said solenoid switches and one of the side terminals of said mechanically operated toggle action single pole double throw switch, a spring loaded off switch interposed in one of said separate connections; the other end of the coil in each of said solenoid switches being grounded, a source of electrical energy that is grounded, wires connecting said source of electrical energy to one end of the coil in each of said solenoids and to the center terminal of said mechanically operated toggle action single pole double throw switch, and separate wires connecting one of the switch terminals of each of said solenoid switches to one of the ends of each of said solenoids respectively, the other switch terminal of each of said solenoid switches being grounded.

3. In a means for actuating a reciprocating plunger grease pump, a base, a first solenoid secured to said base, a second solenoid secured to said base in aligned spaced relation to said first solenoid, a core slidably arranged in each of said solenoids, a shaft connecting said cores, said shaft being smaller in diameter than said cores so as to leave an open space between said cores that lies within a horizontal projection thereof, a switch base secured to said base at a point intermediate of the distance between said solenoids and out of line therewith, a double crank arm pivotally mounted in said switch base and having one of its ends extending into the open space between said cores, a pair of spaced stops on said switch base, the other end of said double crank arm engaging alternately each of said pair of stops, a toggle arm hingedly secured to said switch base, a spring connecting said toggle arm to the stop engaging end of said double crank arm, a pair of switch contacts on said switch base and arranged in the path of said toggle arm, a first solenoid switch operatively supported by said base, a second solenoid switch operatively supported by said base, wires connecting one switch terminal of each of said solenoid switches to each of said solenoids, ground connections for the other switch terminal of each of said solenoid switches, a ground connection for one end of the coil of each of said solenoid switches, a wire extending from the coil of one of said solenoid switches to one of said pair of switch contacts, a spring loaded off switch, a wire connecting the other of said pair of switch terminals to one of the switch terminals of said spring loaded off switch, a wire connecting the other switch terminal of said spring loaded off switch to one end of the coil of one of said solenoid switches, a source of electrical energy, a ground connection for said source of electrical energy, and wires connecting said source of electrical energy to one end of each of said solenoids and to said toggle arm.

4. In a means for actuating a reciprocating plunger grease pump, a base, a first solenoid secured to said base, a second solenoid secured to said base in aligned spaced relation to said first solenoid, a core slidably arranged in each of said solenoids, a shaft connecting said cores, a switch base secured to said base at a point intermediate of the distance between said solenoids and out of line therewith, a double crank arm pivotally mounted in said switch base and having one of its ends extending into the open space between said cores, a pair of spaced stops on said switch base, the other end of said double crank arm engaging alternately each of said pair of stops, a toggle arm hingedly secured to said switch base, a spring connecting said toggle arm to the stop engaging end of said double crank arm, a pair of switch contacts on said switch base and arranged in the path of said toggle arm, a first solenoid switch operatively supported by said base, a second solenoid switch operatively supported by said base, wires connecting one switch terminal of each of said solenoid switches to each of said solenoids, ground connections for the other switch terminal of each of said solenoid switches, a ground connection for one end of the coil in each of said solenoid switches, a wire extending from the coil of one of said solenoid switches to one of said pair of switch contacts, a spring loaded off switch adapted to being mounted on a grease gun, a wire connecting the other of said pair of switch contacts to one of the switch terminals of said spring loaded off switch, a wire connecting the other switch terminal of said spring loaded off switch to one end of the coil of one of said solenoid switches, a source of electrical energy, a ground connection for said source of electrical energy, and wires connecting said source of electrical energy to one end of each of said solenoids and to said toggle arm.

References Cited in the file of this patent

UNITED STATES PATENTS

| Number | Name | Date |
|---|---|---|
| 260,408 | Peck et al. | July 4, 1882 |
| 665,917 | Le Pontois | Jan. 15, 1901 |
| 950,411 | Smith | Feb. 22, 1910 |
| 983,943 | Smith | Feb. 14, 1911 |
| 996,440 | Whalton | June 27, 1911 |
| 1,663,590 | Gourdon | Mar. 27, 1928 |
| 1,858,155 | Harris | May 10, 1932 |
| 1,871,291 | Adams | Aug. 9, 1932 |
| 2,016,888 | Brown | Oct. 8, 1935 |
| 2,027,879 | Piscionere | Jan. 14, 1936 |
| 2,223,895 | Macchioni | Dec. 3, 1940 |